T. S. SCOVILLE.
Level.

No. 25,446.

Patented Sept. 13, 1859.

Witnesses:
J. Fraser
S. J. Allis

Inventor:
Thad. S. Scoville

UNITED STATES PATENT OFFICE.

T. S. SCOVILLE, OF ROCHESTER, NEW YORK.

SPIRIT-LEVEL.

Specification of Letters Patent No. 25,446, dated September 13, 1859.

*To all whom it may concern:*

Be it known that I, T. S. SCOVILLE, of Rochester, in the county of Monroe and State of New York, have invented a new and useful Improvement in Leveling Instruments; and I do hereby declare that the following is a full and exact description thereof, reference being had to the accompanying drawings, making part of this specification, in which—

Figure 1:
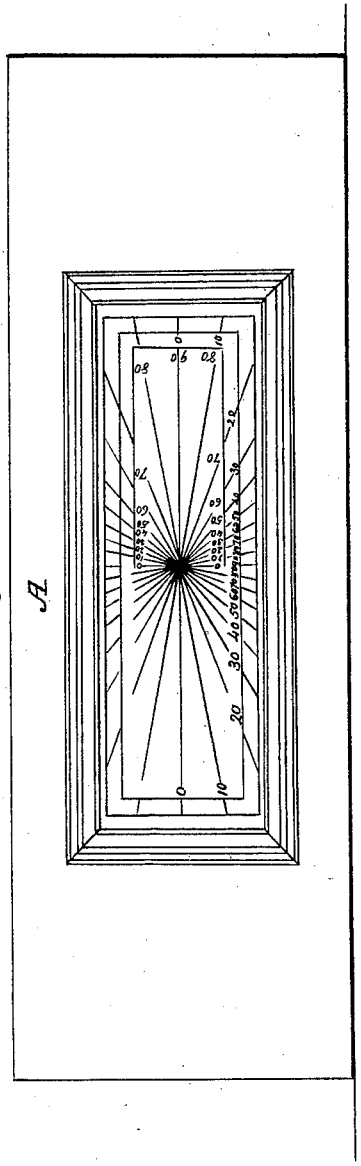
Figure 2:
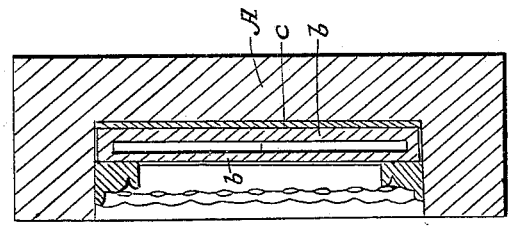

Figure 1, is a longitudinal elevation, and Fig. 2, is a transverse vertical section thereof.

Similar letters refer to corresponding parts in both the figures.

My improvement relates to that class of leveling instruments in which spirits, or other fluid, is employed to determine the horizontal.

As represented in the drawings, A is a piece of mahogany, or other suitable wood, forming the stock of the instrument, and is prepared by having its upper and lower edges planed perfectly straight and parallel, and its ends at right angles with them. In the center of this a mortise is made, and an oblong glass cistern, $b$, containing spirits is inserted.

The cistern may be constructed of blown glass in the form of a thin flat bottle, or it may be formed of two plates of glass cemented together with a slight space between them, in a suitable metallic frame, with a cement that will not be acted upon by spirits or moisture. It should be made as thin as it conveniently can in order not to require too much depth of space in the wooden stock, and should be half filled with spirits and the orifice left for that purpose hermetically closed. It is then inserted in the stock, having at the back of it a scale, $c$, Fig. 2, on which a line 0, running longitudinally through the center, and parallel with the top and bottom of the stock, is zero, or level. This scale is permanently attached to the stock, and the liquid is so adjusted that its surface corresponds exactly with the zero line. This is crossed by a vertical line, also marked 0, and the scale is divided into the usual number of degrees, indicated by lines radiating from the center or point at which the zero lines intersect, at every 10 degrees of the circle.

When used in a horizontal position the surface of the fluid just marks the longitudinal zero line, but when used perpendicularly the fluid coincides with the transverse zero-line.

Two sets of numbers are employed; the scale having vertical figures indicates the angles that are conveniently measured by using the instrument horizontally, and the horizontal figures are for using it vertically, both being adapted so as to read properly in that position of the instrument for which they are intended. Thus by the scale any angle can be measured with accuracy at once, and as it indicates by the gravity of the liquid, or its disposition to assume a level, and there being a sufficient quantity of it to not be affected by friction with the surface of its cell, (as is often the case with the ordinary small tubes filled with spirits and an air-bubble, rendering them tardy and uncertain in their action,) it proves exceedingly valuable and convenient in all cases where leveling and plumbing are required, and for obtaining the degrees of angles. It also presents an advantage over the ordinary instrument by the combined use of the same liquid for indicating both the vertical and horizontal, which is often a great convenience, as well as overcoming the extreme liability to inaccuracy from the dis-adjustment of the two spirit tubes.

What I claim as my invention and desire to secure by Letters Patent, is—

Employing a single transparent cell or cistern of spirits, or other fluids, in combination with the scale, $c$, and rectangular stock A, in such a manner that the surface line of the liquid shall indicate both the horizontal and perpendicular, with the intermediate degrees, substantially in the manner and for the purposes herein set forth.

THAD'S S. SCOVILLE.

Witnesses:
 J. FRASER,
 S. J. ALLIS.